United States Patent [19]
Reisch

[11] Patent Number: 5,128,692

[45] Date of Patent: Jul. 7, 1992

[54] SYMMETRIC BINARY WEIGHTED EXPOSURE METHOD AND APPARATUS EMPLOYING CENTER PULSE WIDTH MODULATION FOR CONTINUOUS TONE PRINTER

[75] Inventor: Michael L. Reisch, Carlisle, Mass.

[73] Assignee: Polaroid Corporation, Cambridge, Mass.

[21] Appl. No.: 653,416

[22] Filed: Feb. 11, 1991

[51] Int. Cl.[5] ............... G01D 15/14; H04N 1/036
[52] U.S. Cl. ............................. 346/107 R; 358/298
[58] Field of Search ............ 346/107 R, 154, 76 PH, 346/108; 364/519; 358/296, 298, 455, 456, 458

[56] References Cited

U.S. PATENT DOCUMENTS

| | | | |
|---|---|---|---|
| 4,558,328 | 12/1985 | Takanashi et al. | 346/76 PH |
| 4,563,693 | 1/1986 | Masaki | 346/76 PH |
| 4,712,116 | 8/1987 | Reinten | 346/107 R |
| 4,727,428 | 2/1988 | Futatsugi et al. | 358/296 |
| 4,750,010 | 6/1988 | Ayers et al. | 346/107 R |
| 4,802,105 | 1/1989 | Suzuki | 364/519 |
| 4,806,950 | 2/1989 | Sekine et al. | 346/76 PH |
| 4,894,712 | 1/1990 | Katsukawa | 346/76 PH |
| 4,897,639 | 1/1990 | Kanayama | 340/812 |
| 4,901,139 | 2/1990 | Wilkinson et al. | 358/13 |

Primary Examiner—Benjamin R. Fuller
Assistant Examiner—David Yockey
Attorney, Agent, or Firm—Edward S. Roman

[57] ABSTRACT

Apparatus for effecting center pulse width modulation of electronic printer lighter emitting elements is disclosed. The most significaant bit of the energization pulse for the printer light emitting elements is centered and each succeeding less significant bit is divided in half so as to form a mirror image on each side of the centered most significant bit.

18 Claims, 13 Drawing Sheets

SYMMETRIC BINARY WEIGHTED EXPOSURE METHOD AND APPARATUS EMPLOYING CENTER PULSE WIDTH MODULATION FOR CONTINUOUS TONE PRINTER

BACKGROUND OF THE INVENTION

1. Field of the Invention

This invention relates generally to a binary weighted method for center pulse width modulation of signals for energizing electronic printer elements, and more particularly, to a simplified method and apparatus for centering the energization pulse for each electronic printer element on the most significant bit and locating half of each less significant bit relative to the centered most significant bit so as to form a mirror image on each side thereof.

2. Description of the Prior Art

Electronic devices for printing or recording an image on various photosensitive media are known in the art. Typically, such devices employ a linear array of light emitting diodes (LEDs). Relative movement between the array and the medium is established for effecting scanning of the array over the medium. Each LED may be selectively energized so that it produces a light pulse effective to expose corresponding pixels in the medium as it is advanced. Exposure occurs on a line by line basis in accordance with a variety of known control schemes. Variations in the energization of the LEDs produce corresponding line by line variations in the exposure of the medium as it is scanned. Such variations may produce undesirable artifacts in the resulting image. Image resolution may be improved by decreasing such variations. Techniques designed to center the exposure within the pixels have been found to be effective.

An analog technique described in Reinten U.S. Pat. No. 4,712,116 employs analog comparator circuits connected to a signal generator to produce a uniformly decreasing and increasing signal and to buffers for storing a corrected image signal. The LEDs are energized with respect to the center of a time interval which corresponds to an image line parallel to the array of LEDs. Ayers et al. U.S. Pat. No. 4,750,010 attempts to digitally generate a set of center pulse width modulated wave forms employing a comparator which compares various preset counts with a variable count in order to vary the light output of the LEDs. Each system requires a complex and expensive array of comparators to achieve the desired result.

It is therefore an object of the present invention to provide a center pulse width modulated wave form employing a simple digital circuit.

It is another object of the present invention to provide a simplified method for effecting center pulse width modulation of printer elements.

It is another object of the present invention to substantially reduce or eliminate line to line artifacts associated with prior arrangements.

SUMMARY OF THE INVENTION

A digital control circuit for effecting center pulse width modulation of signals for energizing electronic printer elements comprises means for storing digital data representative of multi-bit pixels of an image. Means responsive to the stored signals arranges the data for each pixel bitwise in order of significance from the least significant bit to a most significant bit. Means responsive to the arranged data is operative to energize the printer elements in order to expose a portion of the print medium to signals representative of the data bitwise based on significance of the bits. Exposure occurs in a sequence beginning with the least significant bit up to the most significant bit and then to the least significant bit over a selected total exposure interval such that the print medium is exposed to the most significant portion of the data centrally of the exposed portion of the print medium.

The invention also comprises a method for effecting center pulse width modulation of signals for energization of electronic printer elements by organizing the digital data representative of each pixel bitwise in order of significance and selectively exposing the print medium with the energization pulse for the most significant bit centered and each succeeding less significant bit divided in half so as to form a mirror image on each side of the centered most significant bit.

DESCRIPTION OF THE PREFERRED EMBODIMENT

Figure 1:
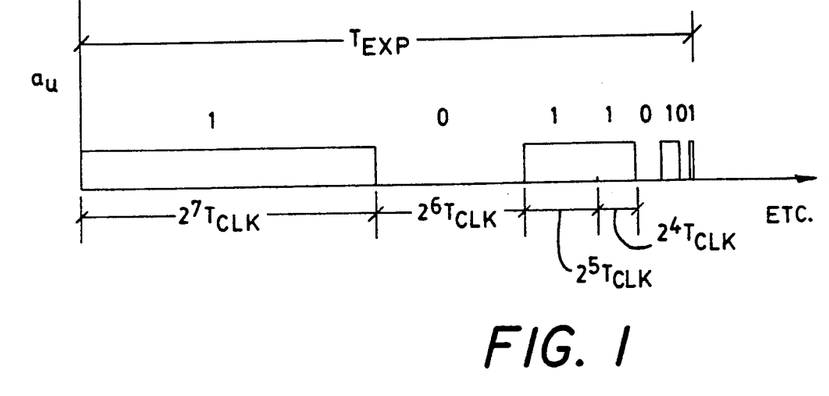
FIG. 1 is a timing diagram of an exemplary pixel with a digital value without center pulse width modulation.
Figure 2:
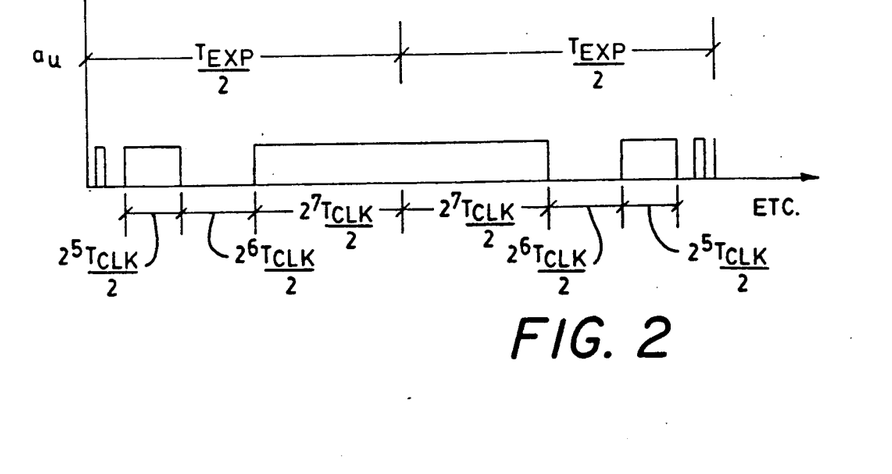
FIG. 2 is a timing diagram of an exemplary pixel illustrated in FIG. 1 but with center pulse width modulation.

Various binary weighted exposure methods are illustrated in FIGS. 1 and 2. Typically, digital pixel data is converted into a stream of time sequential pulses. The sum of the pulses represents the exposure time ($T_{exp}$) needed to achieve a desired film density. The exposure may be expressed as a polynomial in base two arithmetic with integral coefficients having values of 1 or 0 as follows:

$$T_{Exp} = (A_0 2^0 A_1 2^1 + A_3 2^2 \ldots A_2 2^n) \cdot T_{CLK}$$

$A_0 \ldots A_n$ are binary coefficients.

$T_{CLK}$ serves as a scaling factor and is the clock period of the digital timing circuit.

$T_{Exp}$ is the total exposure time.

n is the number of bits per pixel.

$A_n 2^n \cdot T_{CLK}$ represents the time to expose the Nth bit in the pixel.

The timing diagram for an exemplary pixel having a digital value 10110101 is shown in FIG. 1 without center pulse width modulation. The most significant bit (MSB) is the nth or the extreme left hand bit. The least significant bit (LSB) is the 0th or extreme right hand bit.

The MSB contributes $2^n T_{Exp}$ time to expose the nth bit in the pixel. The lesser significant bits contribute proportionally less information and are thus accorded less exposure time.

Print line artifacts usually occur with binary weighted exposure methods when pixels of adjacent lines differ by 1 bit and go through a major carry. For example, a bit 1000 0000 followed by 0111 1111 may cause a band artifact (e.g. no exposure) between lines. The cause of the artifact may result from head motion coupled with the relatively long OFF-ON time between the LSBs of adjacent pixels. One way to correct the problem is to distribute the exposure energy of the pulses during the print interval as shown in FIG. 2.

The exposure time $T_{Exp}$ is the same as the exposure interval illustrated in FIG. 1. However, the most significant bit is centered halfway between the beginning and end of the exposure interval about a time $T_{exp}/2$ and the lesser significant bits form a mirror image about the vertical axis centered at $T_{Exp}/2$. The energy is thus more evenly distributed during the exposure interval and reduces by a factor of two the long OFF-ON interval associated with adjacent line pixels with major carried data patterns. The present invention implements the exposure timing illustrated in FIG. 2.

Figure 3:
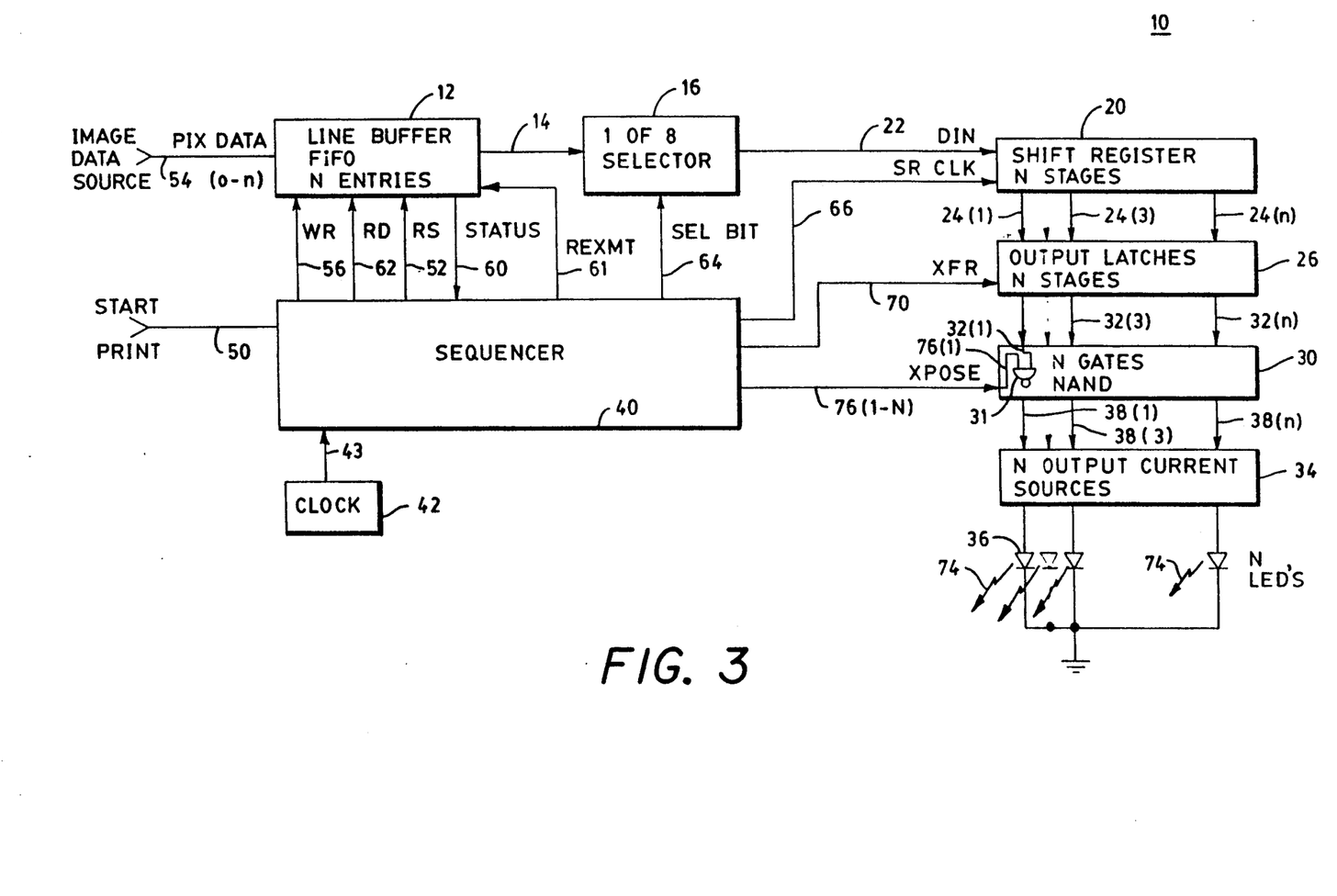
FIG. 3 is a schematic block diagram of a digital circuit employing a simplified center pulse width modulation arrangement according to an embodiment of the present invention.

A circuit 10 for implementing the symmetric binary weighted method employing center pulse width modulation is illustrated in FIG. 3. The circuit 10 comprises a first-in-first-out (FIFO) line memory or buffer 12 with N storage locations to store a single line of data for N pixels. Each pixel comprises n bits of data, and in a preferred embodiment n is eight bits. The output 14 of the buffer 12 is coupled to a one-of-eight selector 16 which in turn is coupled to an N stage shift register 20 over data bus 22 having 1 line. The register 20 is a serial-in/parallel-out type device having N output lines 24 for driving N stage output latches 26. An N gate array 30 employing NAND gates 31 at the outputs 32 of the latches 26 enable corresponding N output drives 34 which pro constant current inputs to $1 \times N$ array of LEDs 36. A sequencer 40 provides appropriate timing signals to sequence the data through each of the logic elements described hereinafter in detail. Clock 42, coupled to sequencer by line 43, provides a clock CLK signal to the circuit 10. The various lines interconnecting the components generally consist of busses of n separately actuable lines (0, 1, 2, . . . n), one line for each bit. Where necessary the lines may be referred to by the reference numeral followed by a bit number in parenthesis. Otherwise, the lines are referred to by reference number alone. Likewise for N stages corresponding to N pixels, the stage number is referenced by its number in parentheses when necessary. Also, a signal or output is referred to by its name in capital letters. An inverted signal or output is referred to by a name which is verlined. It should be understood that the sequences hereinafter described may be optionally enabled by the corresponding inverted signal.

Figure 4A:
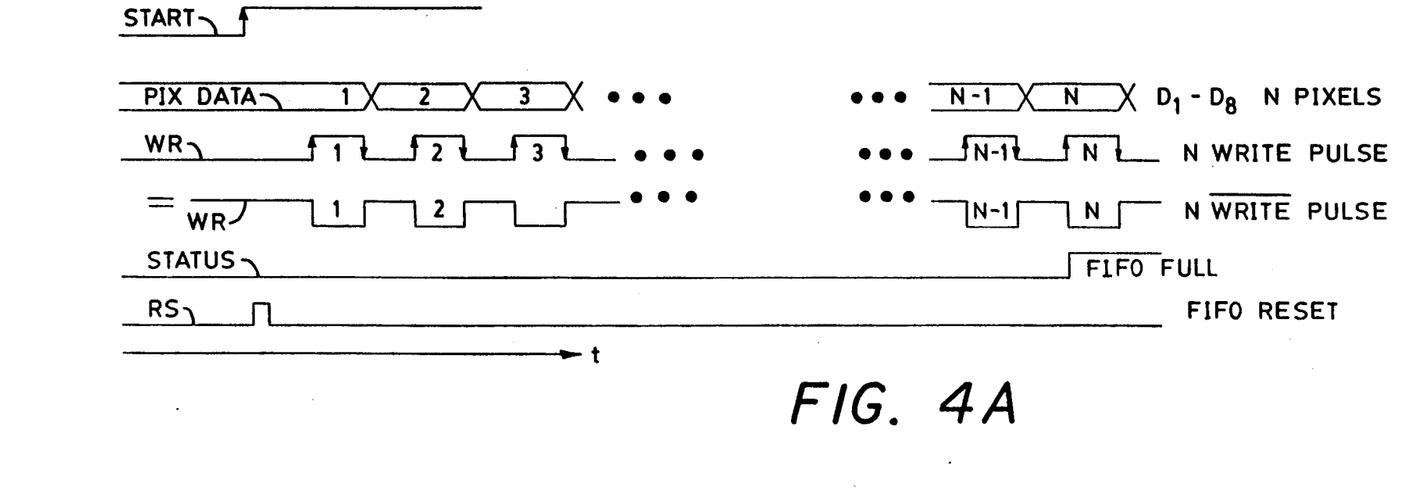
FIGS. 4A-4E are timing diagrams for exemplary control signals employed in the circuit of FIG. 3.

FIG. 4A illustrates the wave forms to write a line of N pixels into buffer 12. START PRINT signal on line 50 begins a print cycle. Sequencer 40 produces a reset signal RS on line 52 which resets the internal pointers of the line buffer 12 to zero. The pointers track pixel data inputs to the buffer 12 on input lines 54 (0 − n) on a first-in-first-out (FIFO) basis for each pixel. Pixel data appearing on input lines 54 is read into the buffer 12 by write pulse WR (or optionally the inverted write pulse $\overline{WR}$) produced by the sequencer 40 on lines 56. After N pixels, each containing n data bits, are written into the buffer 12, it produces a STATUS signal on line 60 which is fed back to the sequencer 40 indicating that the buffer 12 is full.

Figure 4B:
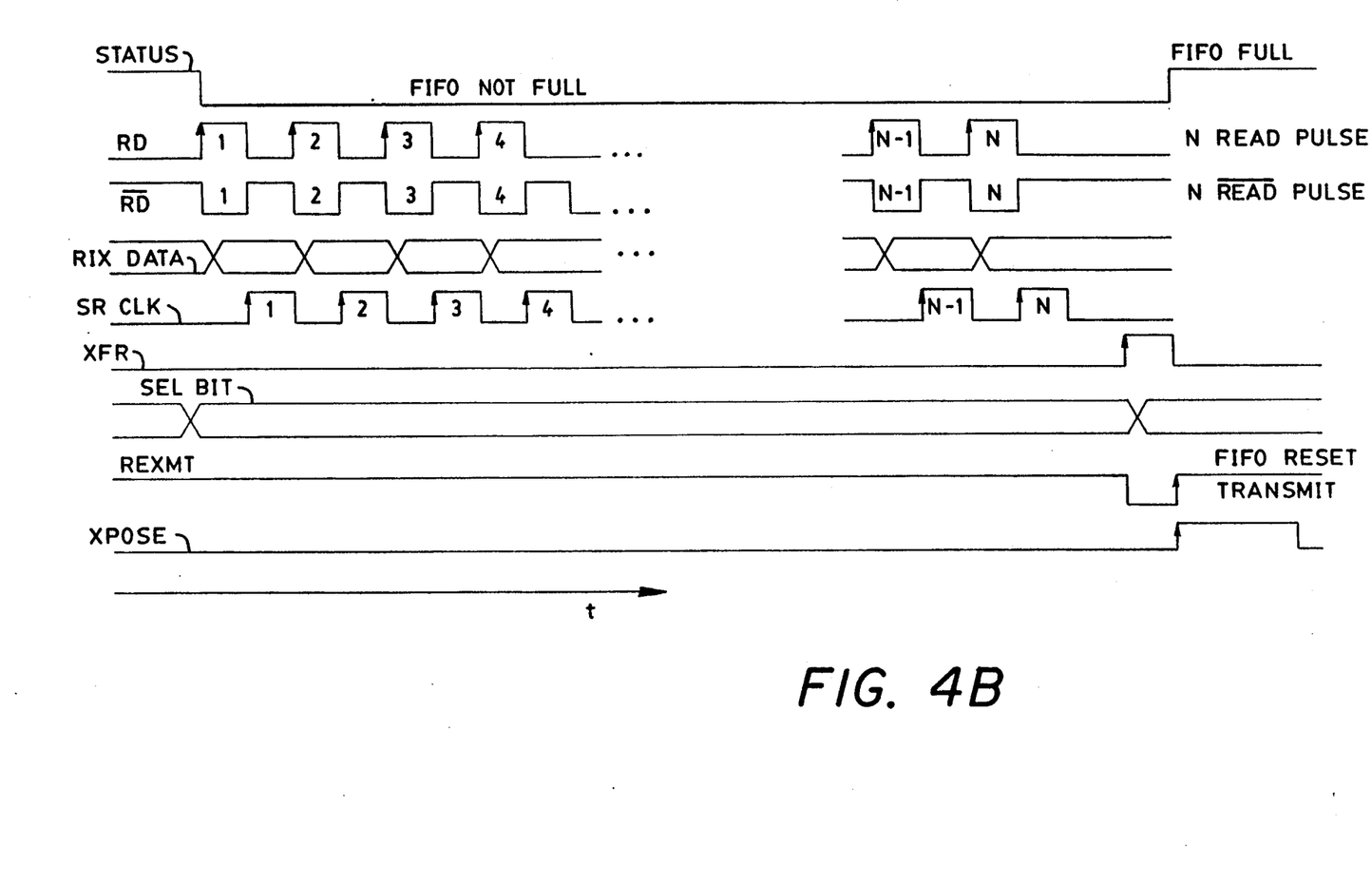

FIG. 4B illustrates the sequence of wave forms to sequentially read pixel data stored in the buffer 12 and load the selected data into the shift register 20. A read data signal RD on line 62 periodically strobes the buffer 12 enabling it to read data into the shift register 20. The one-of-eight selector 16 is initially set to steer the appropriate bit into the shift register. A select bit signal SEL BIT on line 64 of the sequencer 40 enables the selector 16 to select the appropriate bit of each of the N pixels. In a preferred embodiment, bits are selected in sequence from the 0th or least significant bit (LSB) to the nth or most significant bit (MSB) after the read data signal RD. The shift register clock signal SRCLK on line 66 from the sequencer 40 clocks the selected N data bits into the register 20. In other words, when for example the 5th bit is selected, all the 5th bit values for the N pixels are read from the buffer 12 into the register 20. The buffer retransmit REXMT signal on line 61 resets the buffer 12 after a read sequence of one bit each for N pixels. The buffer 12 status signal on line 60 goes low after the first read pulse and remains in that state until the buffer retransmit pulse REXMT at the start of the next read sequence. A total of n read sequences for N pixels equals one complete read cycle.

After one selected bit of each of the pixels has been shifted into the corresponding N stages of shift register 20, the data is transferred in parallel over lines 24 to the output latches 26 in response to a transfer pulse XFR on lines 70. The output latches 26 provide one corresponding input over lines 32(1)–32(N) to each of the NAND gates 31 in the N stage gate array 30. Expose signal XPOSE on lines 76 enables the other corresponding input 76(1)–76(N) of each of the gates 31 for a selected time interval which is variable in accordance with the significance of the bit. In response to the latch output and the expose signal, NAND gate outputs 38(1)–38(N) enable the N output current sources 34 which in turn drive the LEDs 36 to conduct for a selected interval in with the length of the XPOSE signal. The LEDs 36 produce light pulses 74 which expose the medium, not shown. Each set of N bits (0−n) from the pixel data buffer 12 is successively shifted into the shift register 20 and exposed in this manner. Data is shifted and transferred during the period between the onset of the expose signal and the next transfer signal. Optionally, lasers or thermal heaters, not shown, may be employed in place of the LED's 30 with different display media.

Figure 4C:
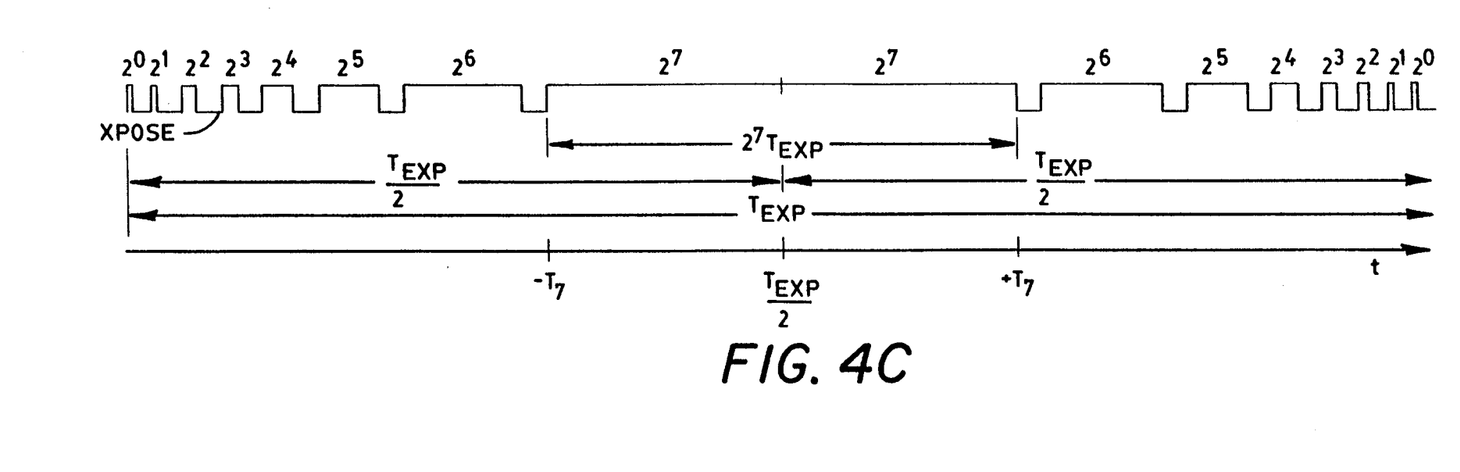

FIG. 4C illustrates the symmetric exposure timing wave form for a multi-bit (0−n) pixel wherein n = 7 (eight bits). The length of the XPOSE signal is selected in accordance with the bit significance. The exposure begins with the LSB $2^0$ (0th bit) and proceeds to the MSB $2^7$ (7th bit) and then decreases to the LSB $2^0$ over the total exposure cycle of $T_{Exp}$. The MSB is centered in the cycle at time $T_{Exp}/2$ and one half each of all lesser significant bits occur on either side in a mirror image as shown.

Figure 4D:
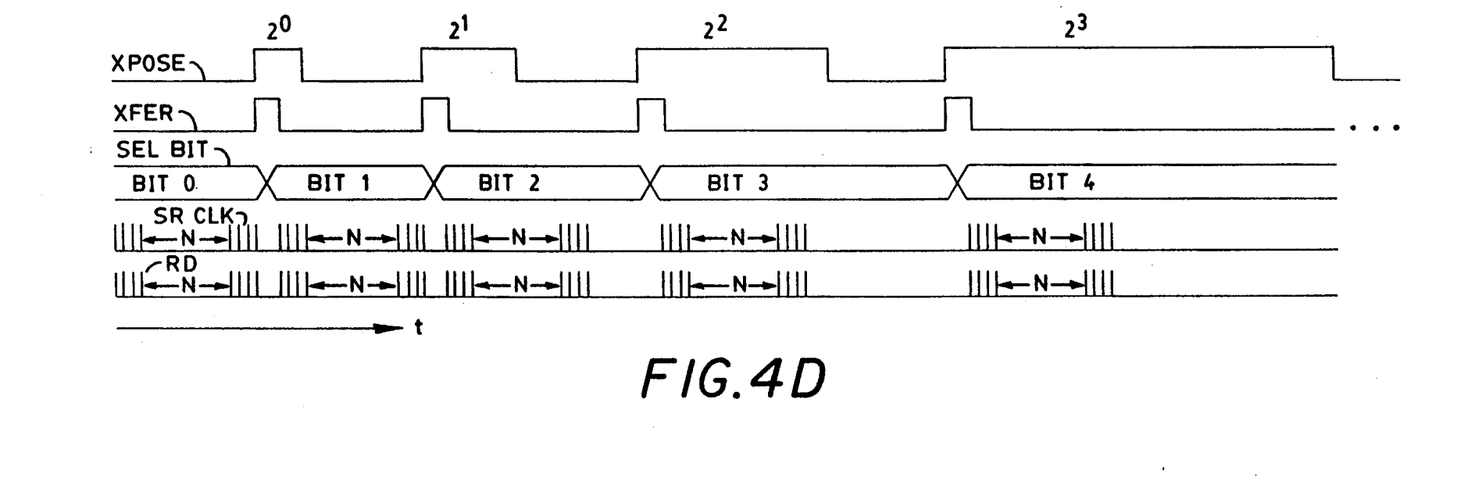

FIG. 4D shows in greater detail the relationship of the XPOSE signal to the XFER pulses. In addition, it can be seen that each bit is loaded in order of significance, from the LSB $2^0$ to the MSB $2^7$ then to the LSB $2^0$, in accordance with the select bit SEL BIT, read RD and shift register clock SRCLK pulses described above.

For an eight bit pixel (n=7), the SEL BIT signal on line 64 selects bits as follows: bit (0) (LSB), bit (1), bit (2), ... bit (7) (MSB) ... bit (2), bit (1), bit (0) (LSB). Selection of bit 7 is thereby centered at $T_{Exp}/2$. That is bit 7 occurs at some time $T_{Exp}/2$ minus $T_7$ prior to midpoint of the expose cycle and terminates at a time $T_{Exp}/2$ plus $T_7$ thereafter (FIG. 4C). The most significant bit, being centered, occurs over its full exposure time $2^7 T_{Exp}$ while the other lesser significant bits occur for one half of their full exposure times $2^n T_{Exp}/2$ on each side of $T_{Exp}/2$. It can be seen from the illustration in FIG. 4D that for an eight bit pixel, $8(2N-1)$ RD and SRCLK pulses are required to expose each line of pixels.

Figure 4E:
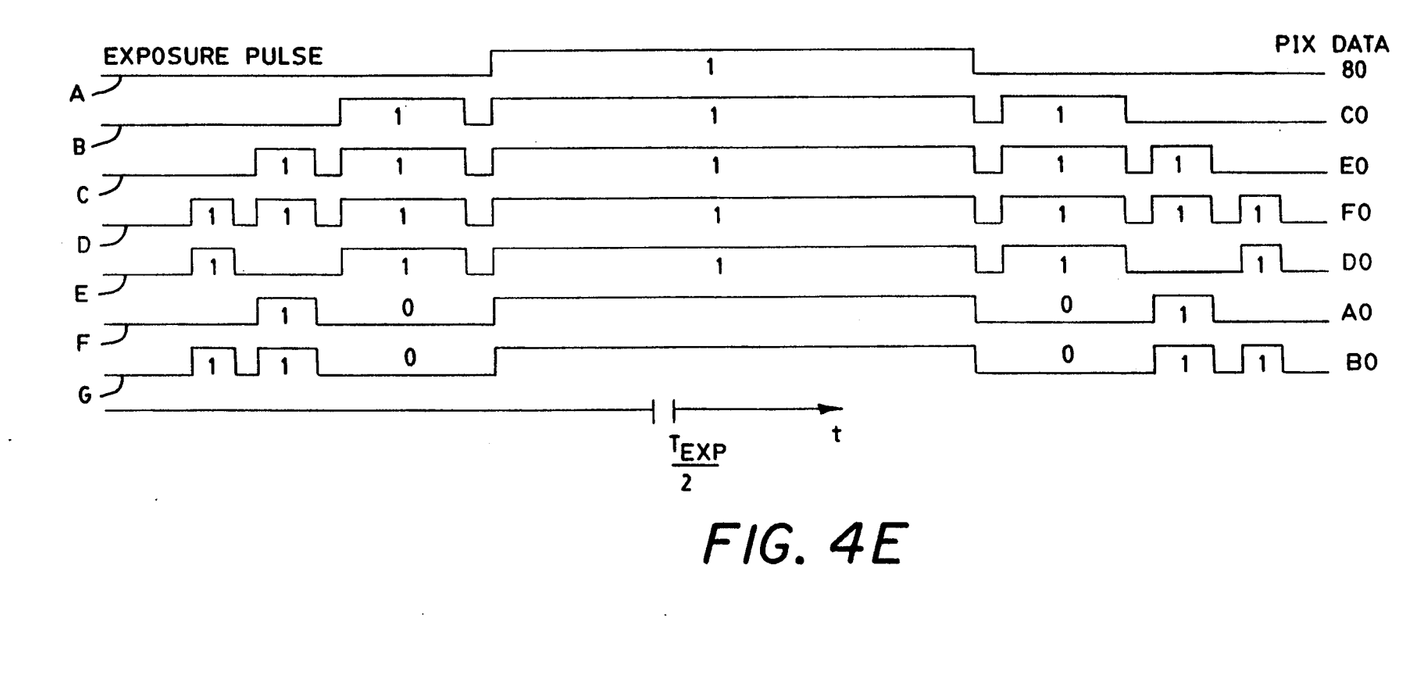

FIG. 4E illustrates examples of typical exposure wave forms A-G with corresponding pixel data to the right in hexadecimal notation. The first exposure pulse (A) has a MSB centered at $T_{Exp}/2$. The MSB is one (1) and all other lesser significant bits are zero (0). Pulses B, C and D have a one (1) as most significant bit followed by 1, 1 1 and 1 1 1 respectively in the lesser bits with all other less significant bits being zero. Exposure pulse E has an MSB of one (1) followed by 1 0 1 with all other less significant bits being zero. Examples F and G have a one (1) as the most significant bit followed by a 0 1 and 0 1 1 respectively with all other less significant bits being zero as illustrated.

Figure 5:
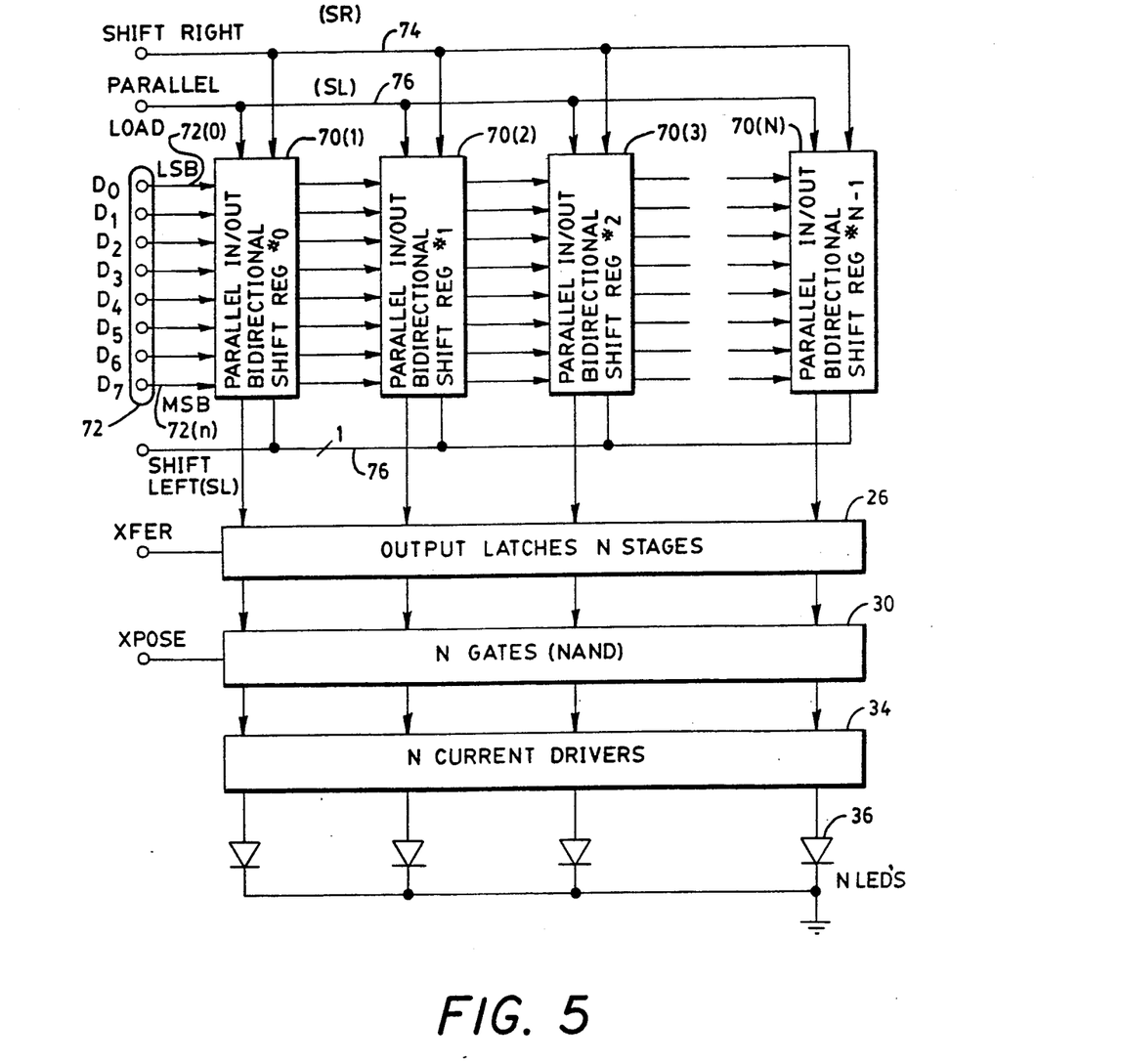
FIG. 5 is a schematic block diagram of a digital circuit according to alternative embodiment of the present invention.

FIG. 5 illustrates an alternative embodiment of the invention which employs N, n stage bidirectional shift registers 70 (1−N). In this arrangement the buffer 12, the one-of-eight selector 16 and the 1×x N shift register 20 are eliminated (FIG. 3). The data is input directly to each register 70 (1−N) over n input lines 72 (0−n). The data is circulated in the registers 70 (1−N) in a first direction from LSB to MSB in response to shift right SR inputs on lines 74. Thereafter, the data is circulated in the opposite direction from MSB to LSB in response to shift left pulse SL on lines 76. Although not shown, the SR and SL signals may be provided by sequencer 40 (FIG. 3). The output latches 26, gate array 30, current sources 34 and LEDs 36 are operative in a manner similar to the arrangement of FIG. 3.

Figure 6A:
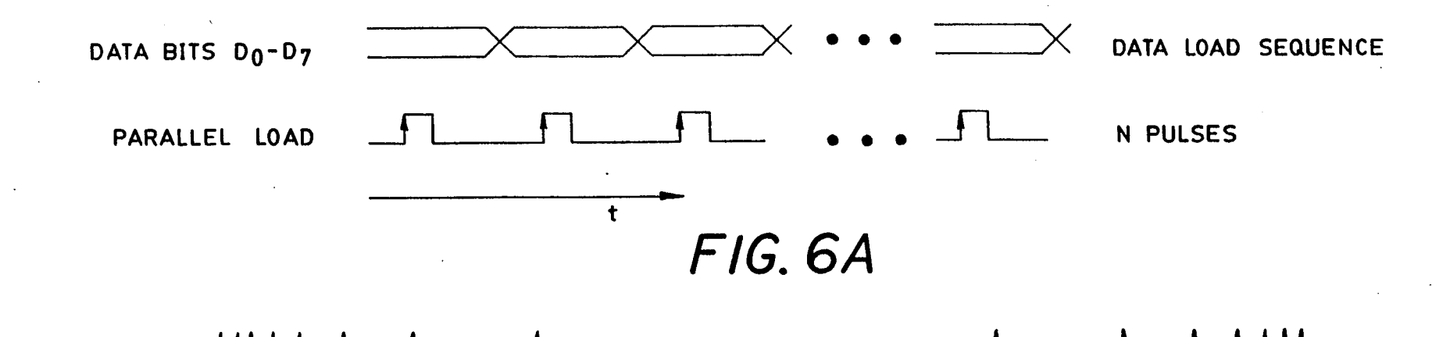
FIGS. 6A-6B illustrate timing diagrams for the arrangement of FIG. 5.
Figure 6B:
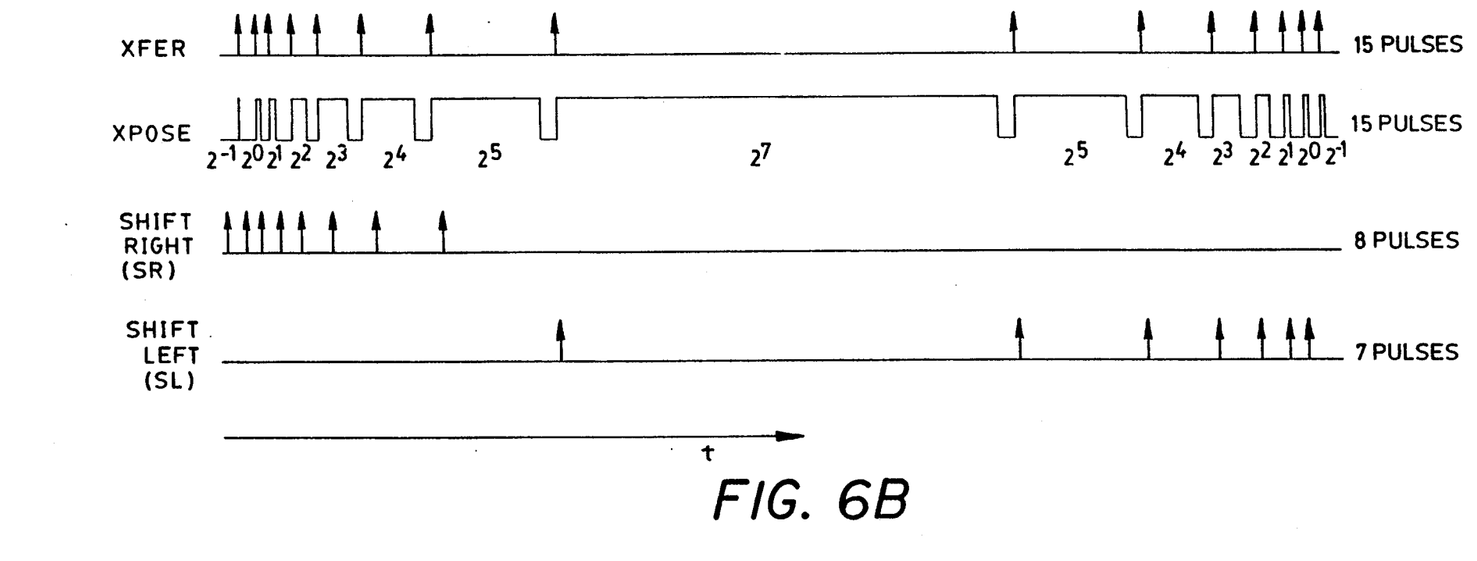

The timing diagram of the arrangement of FIG. 5 is illustrated in FIGS. 6A and 6B. The data is transferred from the shift registers 70 in response to XFER pulses. Exposure occurs in center binary weighted fashion in response to expose pulses XPOSE. Shift right SR and shift left SL pulses drive the shift registers 70 (0−n) in the appropriate direction as shown. Data $D_0$–$D_7$ is loaded in parallel by load pulses.

Figure 7A:
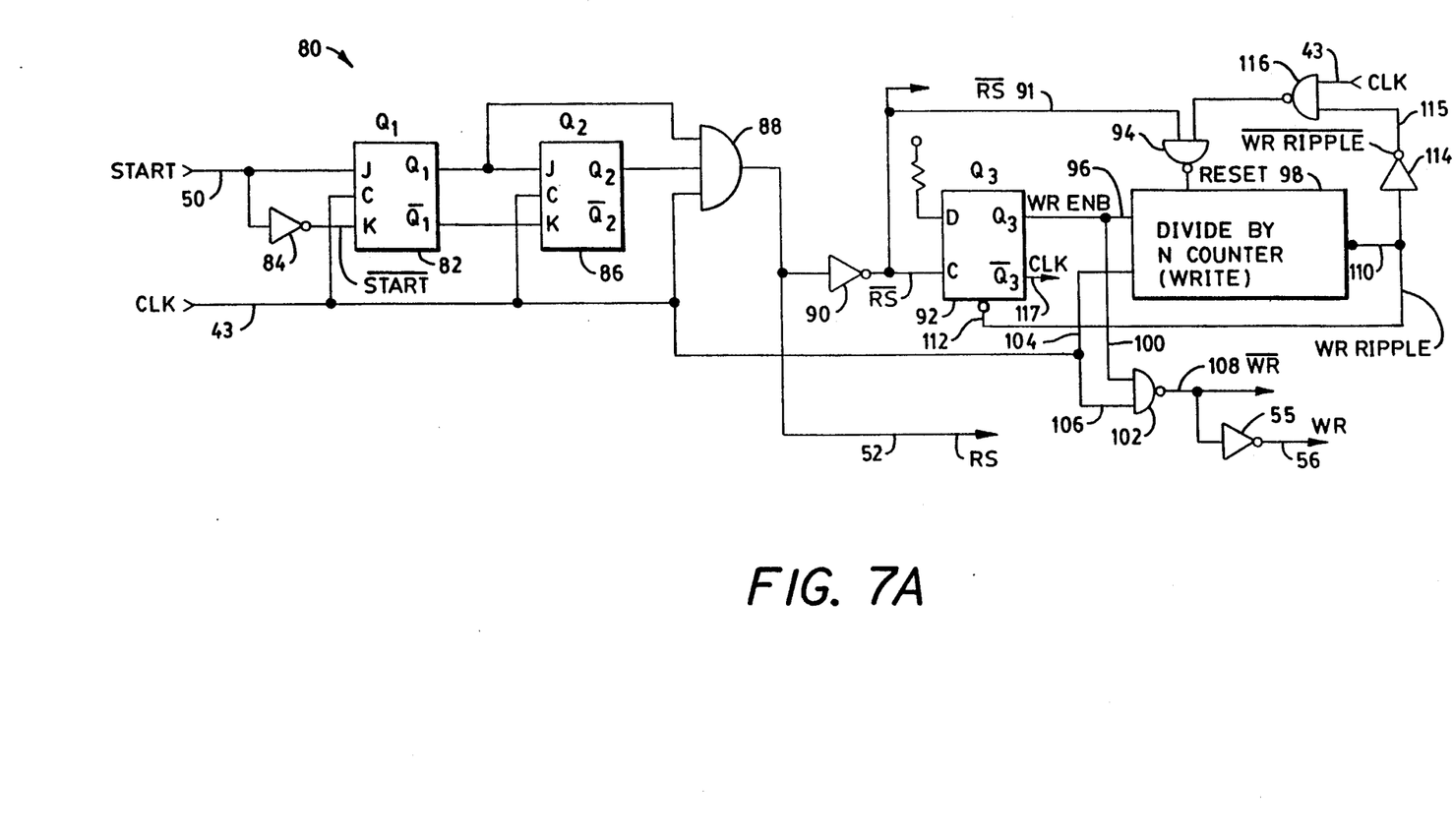
FIGS. 7A-7C illustrate in schematic block form details of the logic employed in the sequencer arrangement shown in FIG. 3.

Logic circuits employed by the sequencer 40 in the embodiment of FIG. 3 for writing data and reading data out of the buffer !2, for generating bit select signals and expose timing signals and corresponding timing diagrams are illustrated in FIGS. 7A-7C and FIGS. 8A-8C. Referring to FIG. 7A, logic circuit 80 employed to write data into buffer 12 is detailed with the accompanying timing chart of FIG. 8A. START signal drives J input of $Q_1$ flip-flop (FF) 82. Inverted START signal ($\overline{START}^{-1}$) is applied to the K input of $Q_1$ FF 82 via inverter 84. Clock input 43 drives the C input as shown. The $Q_1$ and $\overline{Q_1}$ outputs of the $Q_1$ FF 82 drive respective J and K inputs of the $Q_2$ FF 86. Likewise, clock input 43 drives the C input. The clock signal CLK, the $Q_1$ output and $\overline{Q_2}$ output drive AND gate 88 to produce the reset signal RS on line 52. The $Q_1$ FF 82 and $Q_2$ FF 86 synchronize the START signal with the clock signal CLK for initiating a write sequence and the reset RS and retransmit $\overline{REXMT}$ for the buffer 12.

Inverted reset signal $\overline{RS}$ derived from the inverter 90 is applied to the C input of $Q_3$ FF 92 and to one input of reset NOR gate 94. $Q_3$ output of $Q_3$ FF 92 produces write enable WR ENB on input 96 of a divide-by-N write counter 98 and one input 100 of NAND gate 102. Clock input 43 feeds clock input 104 of write counter 98 and the other input 106 of the NAND gate 102 which produces inverted write or $\overline{WR}$ on line 108. The write counter 98 produces a write ripple (WR RIPPLE) output on line 110 at the end of N counts. The WR RIPPLE output is fed back to the reset input 112 of $Q_3$ FF 92 and to a reset NOR gate 94 via inverter 114, line 115, and NAND gate 116 which has the clock input 43 input thereto as shown. The write counter 98 is reset to zero by the WR RIPPLE output. The write counter 98 may also be reset by an inverted reset $\overline{RS}$ at the output of the inverter 90 which may occur during a power up sequence or after the START pulse.

N write pulses WR are produced after the reset pulse RS during the interval that the $Q_3$ output 96 of $Q_3$ FF 92 is active to enable write counter 98. When the counter 98 reaches N counts, the inverted $\overline{WR\ RIPPLE}$ on line 115 resets it to zero and WR RIPPLE output on line 112 resets the $Q_3$ FF 92 causing the write enable WR ENB output on line 96 to go low thereby disabling the counter 98. The inverted write signal $\overline{WR}$ on line 108 is coupled to the buffer 12 by way of inverter 55 and line 56. The WR signal causes the buffer 12 to read data during the enable interval when $Q_3$ output is active or high.

Figure 7B:
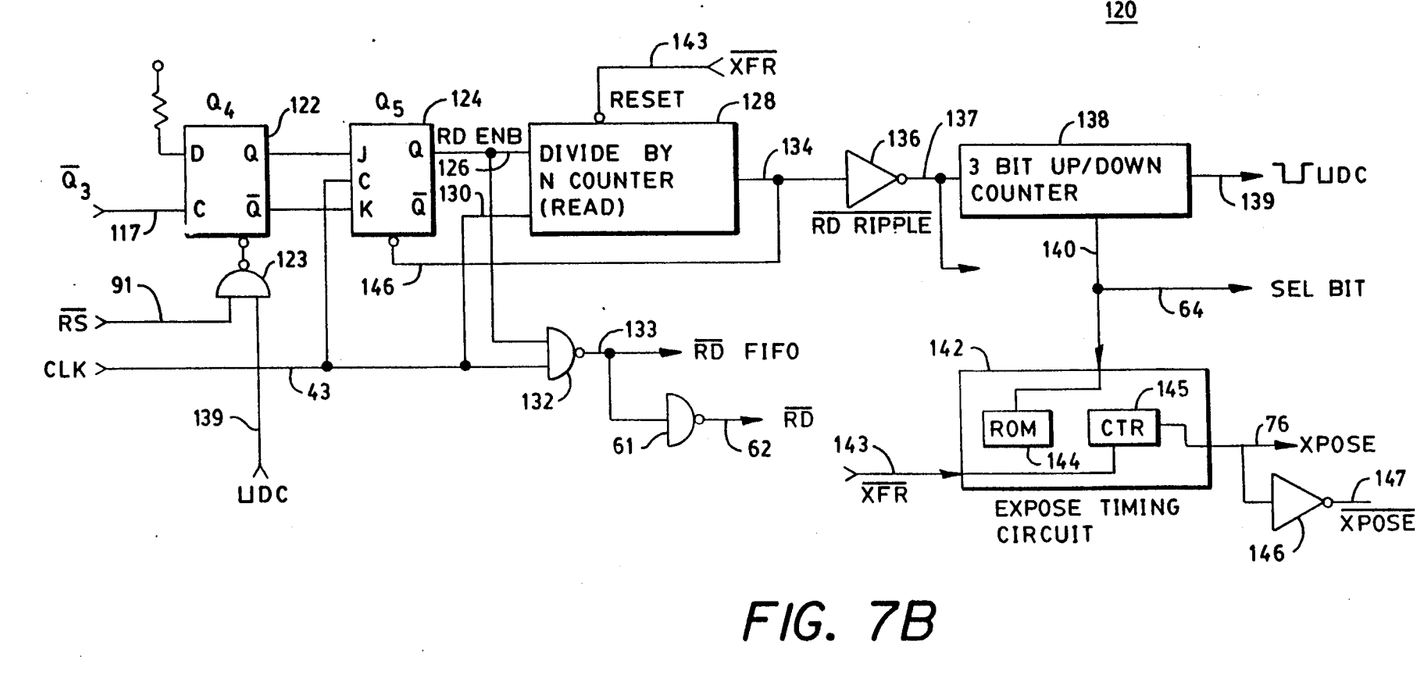
Figure 8A:
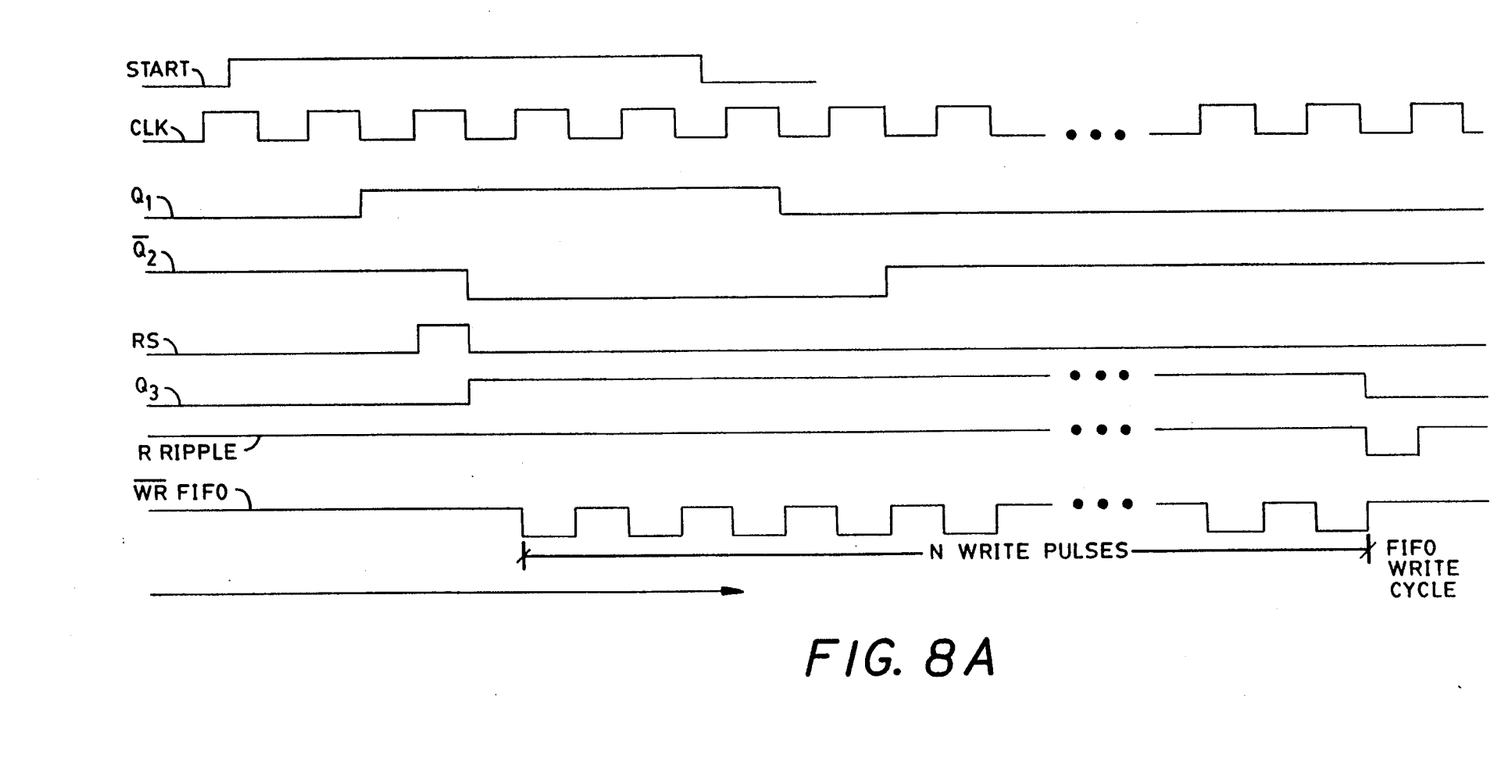
FIGS. 8A-8C are timing diagrams of the respective arrangements illustrated in FIGS. 7A-7C.
Figure 8B:
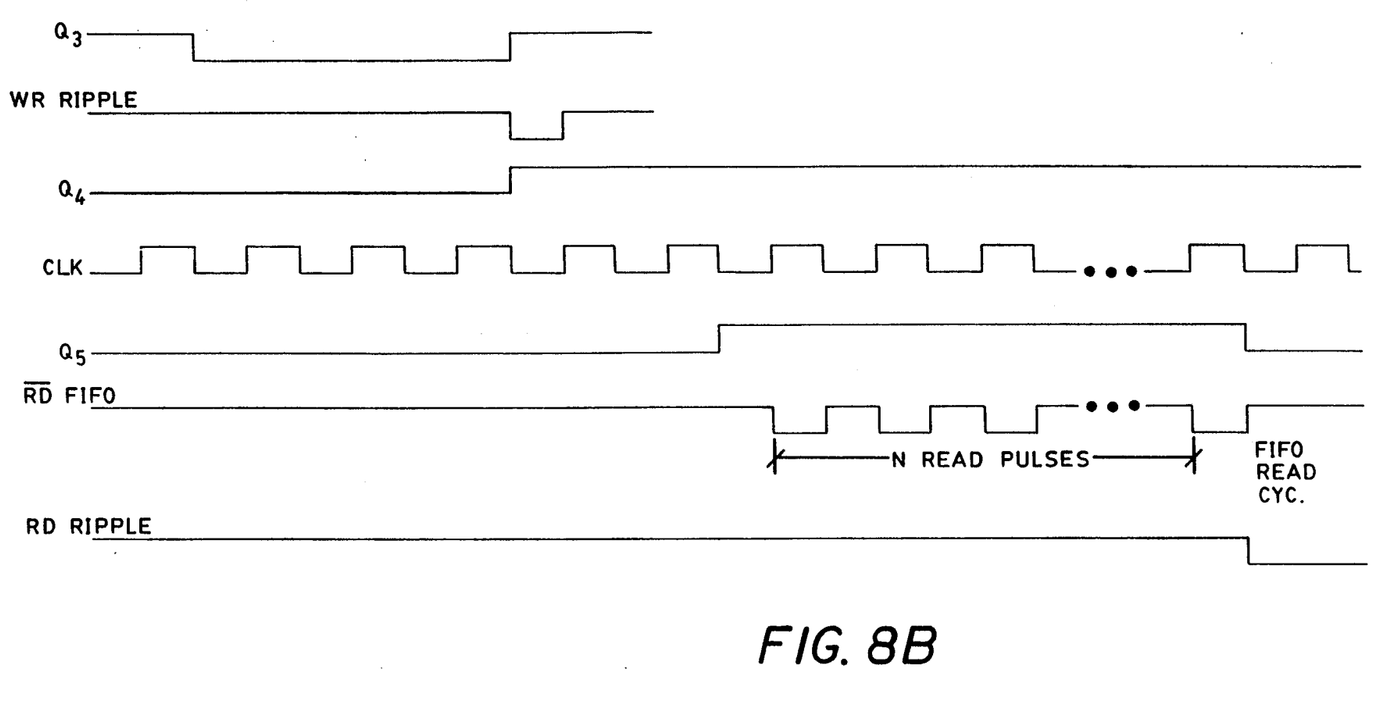

Referring to FIG. 7B, the sequencer 40 is shown to include a logic circuit 120 to read data from buffer 12 into the shift register 20. FIG. 8B shows the accompanying timing chart. $\overline{Q_3}$ output of $Q_3$ FF 92 (FIG. 7A) on line 117 drives the C input of $Q_4$ FF 122. $RS^{-1}$ input on line 91 drives the reset input of $Q_4$ FF 122 through a NOR gate 123. At the conclusion of the write sequence for each line (FIG. 7A, i.e. when $Q_3$ goes low and $\overline{Q_3}$ goes high) the read sequence for each bit is initiated.

The $Q_4$ and $\overline{Q_4}$ outputs of the $Q_4$ FF 122 drive respective J and K inputs of the $Q_5$ FF 124. The clock input on line 43 drives the corresponding clock input thereof as shown. $Q_5$ output of $Q_5$ FF 124 provides a read enable RD ENB signal for input on line 126 of the divide-by-N read counter 128. Clock signal CLK on line 43 drives the other input 130 of the read counter 128. The enable and clock signals also drive NAND gate 132 which produces an inverted read $\overline{RD}$ output on line 133 which is inverted by NAND gate 61 and coupled to the buffer 12 on line 62. At the conclusion of N counts, the read counter 128 produces an RD RIPPLE signal on output 134 which is inverted to $\overline{RD\ RIPPLLE}$ by inverter 136 and coupled to a three bit up/down counter 138. The counter 138 provides the select bit signals SEL BIT on line 140 which are coupled to the selector 16 by line 64 (FIG. 3). The counter output 140 is also coupled to an expose timing circuit 142 which produces XPOSE output on line 76 in response to inverted transfer $\overline{XFER}$ input 143.

The RD RIPPLE output on line 134 of the counter 128 is fed back to reset input 146 of the $Q_5$ FF 124 which is reset at the end of N counts. This causes the read enable RD ENB output on line 126 to go low which stops the read counter 128. Inverted transfer $\overline{XFER}$ on line 143 resets read counter 128.

The buffer 12 is read at the conclusion of the write sequence (FIGS. 7A-8A) when the $\overline{Q}_3$ output of Q3 FF 92 goes low and after the write counter 98 counts down. Thereafter, the Q5 is activated to produce the read enable RD ENB signal which activates the inverted read output $\overline{RD}$ on line 62 and causes the read counter 128 to count down N pulses before resetting the Q5 FF 124 and terminating the read sequence.

Three bit counter 138 counts down one increment for each inverted RD RIPPLE signal, that is, for each sequence of the N read pulses, and produces a three bit output representative of the bit number to be selected by the selector 16. Likewise, the expose timing circuit 142 produces the XPOSE pulse which has a duration corresponding to the bit number for driving the NAND gates 30 as shown in FIG. 3. Up/Down counter 138 produces an up/down completed UDC pulse at the completion of each up/down count cycle in a read cycle. The UDC pulse is conducted on line 139 to the reset input of Q4 FF 122 through NOR gate 123. Q4 FF 122 is reset to start the next read cycle.

The expose timing circuit 142 may include a ROM 144 which loads a timer counter 145. The output 140 of the three bit counter 138 causes the ROM 144 to load the timer counter 145 with a count having a value corresponding to the bit number (e.g. 0th bit 1 count, 1st bit 2 counts ..., nth bit n-1 counts). The counter 145 is enabled on the inverted transfer $\overline{XFER}$ pulses which are synchronized with the clock 43 such that the counter 14 counts pulses from the clock 43. Inverter 146 at the output of the expose timing circuit 142 produces inverted $\overline{XPOSE}$ signal on line 147.

Figure 7C:
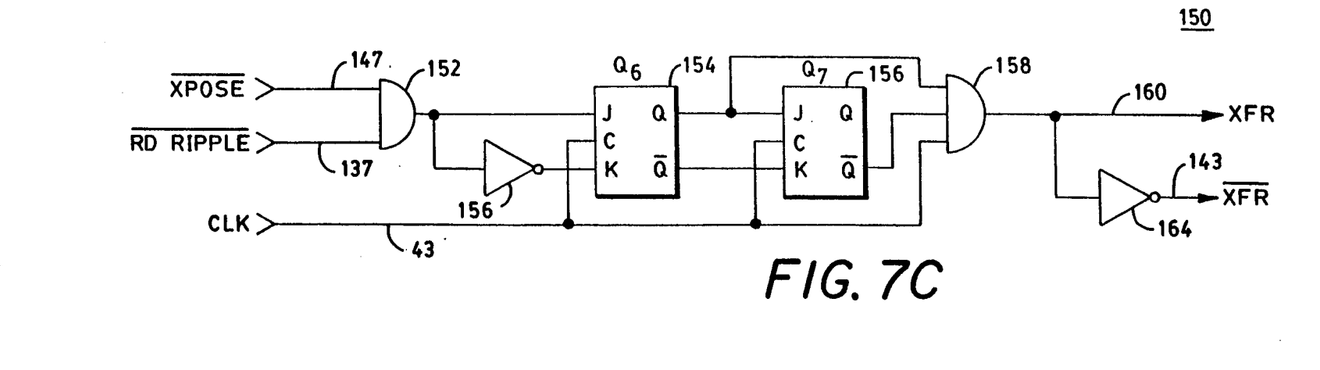
Figure 8C:
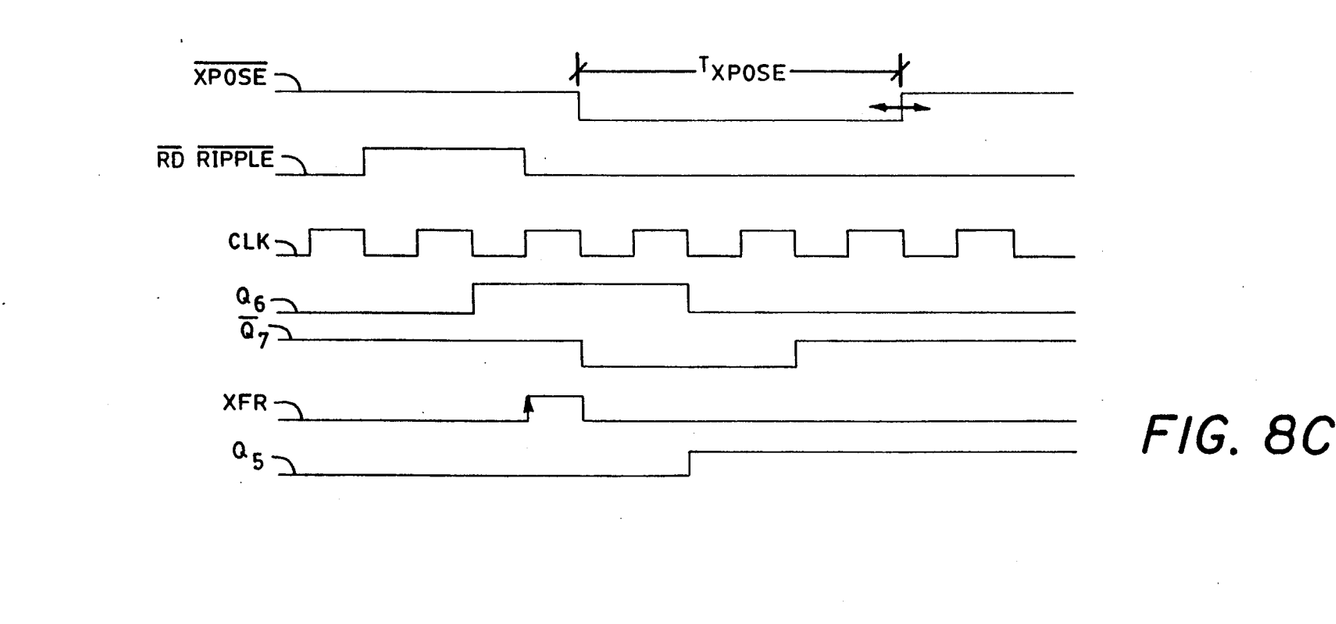

Referring to FIG. 7C, the sequencer 40 further includes a logic circuit 150 to transfer the data from the shift register 20 to the output latches 26 and enable the LEDs 36. FIG. 8C shows the accompanying timing chart. AND gate 152 receives the inverted expose signal $\overline{XPOSE}$ on line 147 and the inverted read ripple RD $\overline{RIPPLE}$ signal on line 137. The AND gate 152 drives the J input of Q6 FF 154 and the K input thereof through inverter 156. Clock signal CLK on line 43 drives the C input thereof as shown. Q6 and $\overline{Q}_6$ outputs of the Q6 FF 154 drive respective J and K inputs of Q7 FF 156, and the clock signal CLK drives the C input as shown.

AND gate 158 combines the Q6 output, and the $Q_y{}^{-1}$ output and the clock signal CLK to produce the transfer signal XFER on line 160 and the inverted transfer $\overline{XFER}$ signal on line 143 through the inverter 164. After the N counts of the read counter 128 (FIG. 7B) XFER pulse is produced. Thereafter, the gates 30 (FIG. 3) are enabled to activate the output current sources 34 and the LEDs 36 during the expose pulse XPOSE which has a length dependent upon the bit number. Exposure starts subsequent to the completion of the transfer pulse (upon the occurrence of the inverted transfer pulse $\overline{XFER}$). $XFER^{-1}$ enables the exposure timing circuit 142 and resets the read counter 128 (FIG. 7B).

The present invention provides center pulse width modulation of digital electronic printer elements by locating the most significant bit of data at the center of the exposure interval. Less significant bits are located as a mirror image about the most significant bit. The various embodiments described employ simplified digital circuitry without costly and cumbersome comparator circuits.

While there have been described what at present are believed to be the preferred embodiments of the present invention, it will be apparent to those skilled in the art the various changes and modifications may made therein without departing from the invention, and is intended in the appended claims to cover all such modifications and changes that come within true spirit and scope of the invention.

What is claimed is:

1. Apparatus for effecting center pulse width modulation of signals for energizing electronic printer light emitting elements comprising:
   buffer means for storing multi-bit digital data representative of pixels for an image, each bit of said multi-bit digital data having a select significance within a designated range between a least significant bit and a most significant bit;
   selector means responsively coupled to the buffer means for selecting, based on significance, one bit of each pixel;
   register means having at least one stape of each pixel responsively coupled to the selector means for storing one bit of each pixel in a corresponding stage;
   gate means coupled between the register means and the printer elements for selectively energizing the printer elements in response to selected bits stored in the register means; and
   sequencer means operatively coupled to the selector means, the register means and the gate means for reading bits of each pixel into the register means in an order from the least significant bit to the most significant bit to the least significant bit.

2. The apparatus of claim 1 wherein the sequencer means is operatively coupled to the gate means for enabling the gate means for an exposure time period $T_{Exp}$ and the most significant bit occurs during a time within $T_{Exp}$ centered at $T_{Exp}/2$ and lesser significant bits occur so as to form a mirror image on each side of the most significant bit before and after $T_{Exp}/2$.

3. The apparatus according to claim 1 further including latch means coupled between the register means and the gate means and being responsive to the sequencer means for receiving data from the register means and transferring the data to the gate means upon an occurrence of a transfer pulse from the sequencer means.

4. The apparatus according to claim 1 wherein the pixels have n bits each and the selector means comprises a one of n selector.

5. The apparatus according to claim 1 further including output current source means responsively coupled to the gate means and having outputs coupled to the printer light emitting elements for energizing said printer light emitting elements in response to an output from the gate means.

6. The apparatus according to claim 1 wherein the printer light emitting elements comprise electrical devices selected from the group consisting of light emitting diodes, lasers and thermal heaters.

7. The apparatus according to claim 1 wherein the register means comprises a one by N array of register stages, wherein N is a select number of pixels to be imaged at a time.

8. The apparatus of claim 1 wherein the sequencer means includes write logic means for writing data into the buffer means comprising write timing means responsive to a START signal and a clock signal for producing a write enable signal, and a rest signal, and a write counter responsive to the write enable signal and the clock signal for counting a number of clock signals corresponding to a select number of pixels, said write signal operative to enable the buffer means to receive data during N counts of the counter corresponding to the number of pixels.

9. The apparatus of claim 8 wherein the write counter includes a reset circuit for resetting the write counter and the write timing means at the end of N counts.

10. The apparatus of claim 1 wherein the sequencer means includes read logic means for reading data from the buffer means to the register means comprising read timing means responsive to a reset signal and a clock pulse signal for producing a read signal and a read enable signal, and read counter means responsive to the read enable signal and clock pulse signal for counting a select number N of pulses in the clock pulse signal corresponding to a select number N of pixels so as to terminate said read signal which is operative to enable the register means to read data during the N counts of the read counter means.

11. The apparatus of claim 10 wherein the selector means further comprises up/down counter means responsive to the read counter means for producing a select signal to said selector means in accordance with the significance of each bit of the multi-bit digital data.

12. The apparatus of claim 11 wherein the selector means further includes exposure timing circuit means responsive to the select signal for producing a variable length timing signal in accordance with the significance of each bit of the multi-bit digital bit.

13. The apparatus of claim 12 wherein the selector means further includes transfer timing means responsive to the read counter means and, the exposure timing circuit means and the clock pulse signal for producing a transfer signal for enabling the transfer of data from the register means to the gate means.

14. The apparatus of claim 13 wherein the exposure timing circuit means includes means for storing counts having values corresponding to the significance of each bit of the multi-bit digital data and counter means responsive to the storage means for counting a member of corresponding to a value stored within the storage means and producing the variable length timing signal in accordance with the number of counts so counted.

15. Apparatus for effecting exposure of a print medium by center pulse width modulation of signals for energizing electronic printer light emitting elements in a system whereby relative movement between the printer elements and medium is provided, said apparatus comprising:

storage means for storing multi-bit digital data representative of pixels of an image wherein each bit of said multi-bit digital data has a select significance within a designated range between a least significant bit and a most significant bit, said storage means operating to store bits of said multi-bit digital data in an ordered sequence of bits representative of a significance of the bits;

logic means operatively coupled to the storage means for generating output signals representative of the stored bits for each pixel based upon significance of the bits, from the least significant bit to the most significant bit then to the least significant bit over a selected total exposure interval; and means responsive to the output signals and operatively coupled to the printer elements for energizing the printer light emitting elements to selectively expose a portion of the print medium such that the print medium is exposed in correspondence to the most significant bit of the multi-bit digital data centrally of the exposed portion of said print medium during said relative movement.

16. The apparatus of claim 15 wherein the storage means comprises an n × N array of register stages where n is a number of bits per pixel and N is a number of pixels.

17. The apparatus of claim 16 wherein the array of register stages includes N reversible circulating registers.

18. Apparatus for effecting center pulse width modulation of signals for energizing electronic printer light emitting element comprising:

register means having multiple stage for storing multi-bit digital data representative of pixels of an image, each bit of said multi-bit digital data having a select significance within a designated range between a least significant bit and a most significant bit, each one of said multiple stages operating to store one bit representative of each pixel in a corresponding stage;

gate means coupled between the register means and the printer light emitting elements for selectively energizing the printer light emitting elements in response to selected bits stored in the register means; and sequencer means coupled to the register means and the gate means for reading bits representative of each pixel into the register means in an order from the least significant bit to the most significant bit to the least significant bit.

* * * * *